(12) United States Patent
Pal et al.

(10) Patent No.: US 11,170,145 B1
(45) Date of Patent: Nov. 9, 2021

(54) METHOD AND SYSTEM TO GENERATE THERMOPHYSICAL PROPERTY FOR FINITE ELEMENT BASED SOLVERS

(71) Applicant: ANSYS, INC., Canonsburg, PA (US)

(72) Inventors: Deepankar Pal, Holladay, UT (US); Abdul Khader Khan, Salt Lake City, UT (US)

(73) Assignee: ANSYS, INC., Canonsburg, PA (US)

( * ) Notice: Subject to any disclaimer, the term of this patent is extended or adjusted under 35 U.S.C. 154(b) by 334 days.

(21) Appl. No.: 16/457,902

(22) Filed: Jun. 28, 2019

Related U.S. Application Data

(60) Provisional application No. 62/819,299, filed on Mar. 15, 2019.

(51) Int. Cl.
| | |
|---|---|
| *G06F 30/23* | (2020.01) |
| *G06F 111/02* | (2020.01) |
| *G06F 111/10* | (2020.01) |
| *G06F 111/20* | (2020.01) |
| *G06F 119/18* | (2020.01) |

(52) U.S. Cl.
CPC .......... *G06F 30/23* (2020.01); *G06F 2111/02* (2020.01); *G06F 2111/10* (2020.01); *G06F 2111/20* (2020.01); *G06F 2119/18* (2020.01)

(58) Field of Classification Search
None
See application file for complete search history.

(56) References Cited

U.S. PATENT DOCUMENTS

2018/0322222 A1* 11/2018 Cochrane ................ G06F 30/00
2020/0184125 A1* 6/2020 Machalica .............. G06F 30/17

* cited by examiner

*Primary Examiner* — Craig C Dorais
(74) *Attorney, Agent, or Firm* — Womble Bond Dickinson (US) LLP

(57) ABSTRACT

In one embodiment, a system derives non-equilibrium thermophysical values for phase property changes of a material from equilibrium thermophysical values of the material for a manufacturing process which involves heating and/or cooling of the material (such as an additive manufacturing, 3D printing, welding, or joining process). The system performs a simulation of the manufacturing process based upon the derived non-equilibrium and/or equilibrium thermophysical values. The system generates a set of results based on the simulation, the set of results indicating predicted physical properties of the material for the manufacturing process.

22 Claims, 21 Drawing Sheets

| 613-691K | 692-697K | 698-701K | 703-822K | 823-1045K | 1046-1065K | 1066-1117K | 1118-1222K | 1223-1229K | 1230-1640K | 1641-1660K | 1661-1685K | 1686K+ |
|---|---|---|---|---|---|---|---|---|---|---|---|---|
| BCC_A2#2 | | | | | | | | | | | | |
| P#1 | P#1 | P#1 | | | | | | | | | | |
| BCC_A2#1 | | BCC_A2#1 | BCC_A2#1 | BCC_A2#1 | | | | | | | | |
| M3P_D0E#1 | | | HCP_A3#2 | HCP_A3#2 | HCP_A3#2 | HCP_A3#2 | HCP_A3#2 | | | | | |
| LAVES_PHASE_C14#1 | | | M3P_D0E1 M3P_D0E1 | M3P_D0E1 | | | | | | | | |
| SIGMA#1 | | | LAVES_PH LAVES_PH LAVES_PHAS LAVES_PHASE_C14#1 | | | | | | | | | |
| M23C6#1 | | | SIGMA#1 SIGMA#1 | SIGMA#1 | SIGMA#1 | SIGMA#1 | | | | | | |
| MNS#1 | | | M23C6#1 M23C6#1 | M23C6#1 | M23C6#1 | M23C6#1 | M23C6#1 | M23C6#1 | | | | |
| FCC_A1#1 | | | MNS#1 MNS#1 | MNS#1 | MNS#1 | MNS#1 | MNS#1 | MNS#1 | MNS#1 | MNS#1 | | |
| | | | FCC_A1#1 FCC_A1#1 | FCC_A1#1 | FCC_A1#1 | FCC_A1#1 | FCC_A1#1 | FCC_A1#1 | FCC_A1#1 | FCC_A1#1 | FCC_A1#1 | |
| | | | | | | | | | | Liquid | Liquid | Liquid |

Solidus temp 1640K   Liquidus temp 1686K

FIG. 7

METHOD AND SYSTEM TO GENERATE THERMOPHYSICAL PROPERTY FOR FINITE ELEMENT BASED SOLVERS

RELATED APPLICATIONS

This application is related to U.S. Provisional Patent Application No. 62/819,299 entitled, "METHOD AND SYSTEM TO GENERATE THERMOPHYSICAL PROPERTY FOR FINITE ELEMENT BASED SOLVERS" filed Mar. 15, 2019. The disclosure of the above application is incorporated by reference in its entirety.

BACKGROUND

Additive manufacturing, such as 3-dimensional (3D) printing, is a process in which a material solidifies layer-by-layer using a computer control system to generate a manufacturing article. For 3D printing, an energy source (such as a laser beam) is provided to a scanner, which focuses the beam on a portion of the 3D printing material. The 3D printing material, such as a metal powder, transforms from solid to liquid states due to the energy source and then undergoes quick solidification once the energy source is removed. This process is performed iteratively layer-by-layer to generate the manufactured article. Due to the rapid solidification involved in 3D printing, thermophysical material properties such as density, heat capacity and thermal conductivity, etc. are transformed due to melt undercooling, solute trapping and solute drag. These material property transformations often result in non-equilibrium thermophysical properties (e.g. time varied or dynamic) due to the high heating and cooling rates of additive manufacturing. Note that equilibrium refers to thermodynamic equilibrium where a system is in thermodynamic equilibrium if the system is in mechanical, physical, and thermal equilibrium.

Existing CALPHAD methods only generate equilibrium thermophysical properties for materials. However, thermal simulations for additive manufacturing using static and/or equilibrium thermos-physical material properties are often inaccurate. Furthermore, static and equilibrium CALPHAD models typically are not associated with commercial numerical modeling approaches such as finite element simulations.

Moreover, finite element simulations typically rely on a handbook table to look up material compositions of the materials to be simulated but the material compositions do not capture variations in thermos-physical and structural property for the materials (e.g., non-equilibrium states) in additive manufacturing.

There is a need to accurately model manufacturing processes with non-equilibrium states such as additive manufacturing process.

BRIEF DESCRIPTION OF THE DRAWINGS

Embodiments of the disclosure are illustrated by way of example and not limitation in the figures of the accompanying drawings in which like references indicate similar elements.

FIG. 7 is a block diagram of calculations for phase transition temperature ranges for 316L SS according to one embodiment.

DETAILED DESCRIPTION

Figure 1A:
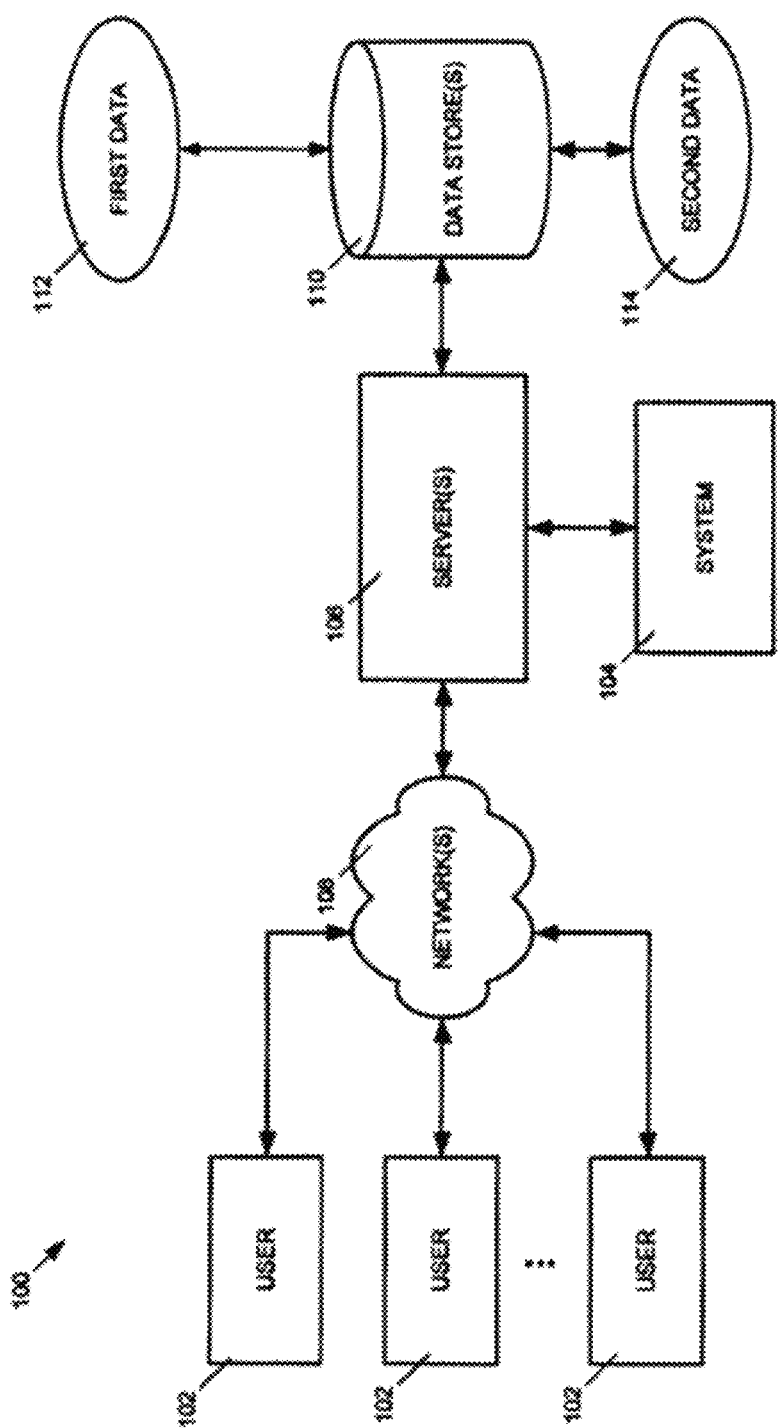
FIG. 1A is a block diagram illustrating a networked system according to one embodiment.

Embodiments for systems and methods of an integrated computational material engineering-based approach to generate non-equilibrium thermophysical material properties for thermal simulations (e.g., using a finite element solver) of an additive manufacturing process or other processes are disclosed.

According to a first aspect, a system derives non-equilibrium thermophysical values for phase property changes of a material from equilibrium thermophysical values of the material for a manufacturing process which involves heating and/or cooling of the material (such as an additive manufacturing, 3D printing, welding, or joining process). The system performs a simulation of the manufacturing process based upon the derived non-equilibrium and the equilibrium thermophysical values. The system generates a set of results based on the simulation, the set of results indicating predicted physical properties of the material for the manufacturing process.

In one embodiment, the set of outputs based on the simulation is used in a finite element analysis solver to simulate a process (e.g., additive manufacturing process). In one embodiment, the set of outputs include properties such as coefficient of thermal expansion, density, specific heat, and/or thermal conductivity, which may or may not be temperature dependent. In another embodiment, the set of outputs include a lookup table. The non-equilibrium calculations sometime can be chaotic over a temperature range. In another embodiment, the non-equilibrium thermophysical values are smoothed over a temperature range when the non-equilibrium thermophysical values encounter a sudden change as a function of temperature, the smoothing includes calculating an average gradient of the thermophysical property values under consideration and back-calculating the thermophysical property based on boundary values at solidus (highest temperature at which an alloy completely solidifies) and liquidus (lowest temperature at which an alloy completely melts) for variations in the non-smooth thermophysical property values. For example, an average gradient can be calculated over a predetermined temperature range for a thermophysical property surrounding a non-smooth region. The back-calculation can then derive new thermophysical property values (fixing some boundary values at the solidus and liquidus) based on the calculated average gradient. In other words, the thermophysical property values are readjusted and smoothened based on boundary values at solidus and liquidus. An example formula for the above smoothening calculation can be: P=P_S+(P_L−P_s)*(T−T_s)/(T_L−T_s), where P is the value of the thermophysical property at Temperature T, P_s is the value of the property at solidus temperature T_s, P_L is the value of the property at liquidus temperature T_L, and (P_L−P_s)/(T_L−T_s) is the average gradient.

According to a second aspect, a system derives equilibrium thermophysical values for phase property changes of a material from a material composition of the material for a manufacturing process which involves heating and/or cooling of the material (such as an additive manufacturing, 3D printing, welding, or joining process). The system performs a simulation of the manufacturing process based upon the derived equilibrium thermophysical values. The system generates a set of results based on the simulation, the set of results indicating predicted physical properties of the material for the manufacturing process.

The first novel point in embodiments of this disclosure is that a CALPHAD approach is used to compute thermophysical property values of materials from first principles and the computed values are incorporated in a Finite Element solver in an automatic and efficient fashion. The second novel point is the inclusion of process dynamics in the existing equilibrium and non-equilibrium CALPHAD computations using physics-based formulations such as solute trapping. The third novel point is the inclusion of a smoothening function to reduce abrupt changes in the computed thermophysical property values.

FIG. 1A is a block diagram illustrating a networked system according to one embodiment. FIG. 1A depicts at 100 a computer-implemented environment wherein users 102 can interact with a system 104 hosted on one or more servers 106 through a network 108. The system 104 contains software operations or routines. The users 102 can interact with the system 104 through a number of ways, such as over one or more networks 108. One or more servers 106 accessible through the network(s) 108 can host system 104. It should be understood that the system 104 could also be provided on a stand-alone computer for access by a user. Note the system 104 can also be accessed through an application programmable interface (API). The inputs to the system 104 include material composition, process dynamics such as a speed of laser, power of laser, and scan pattern for additive manufacturing processes, etc. The outputs for the system 104 include partition coefficient, density, specific heat, thermal conductivity, and coefficient of thermal expansion, which can be used by finite element solvers, e.g. for simulating the additive manufacturing processes.

Figure 1B:
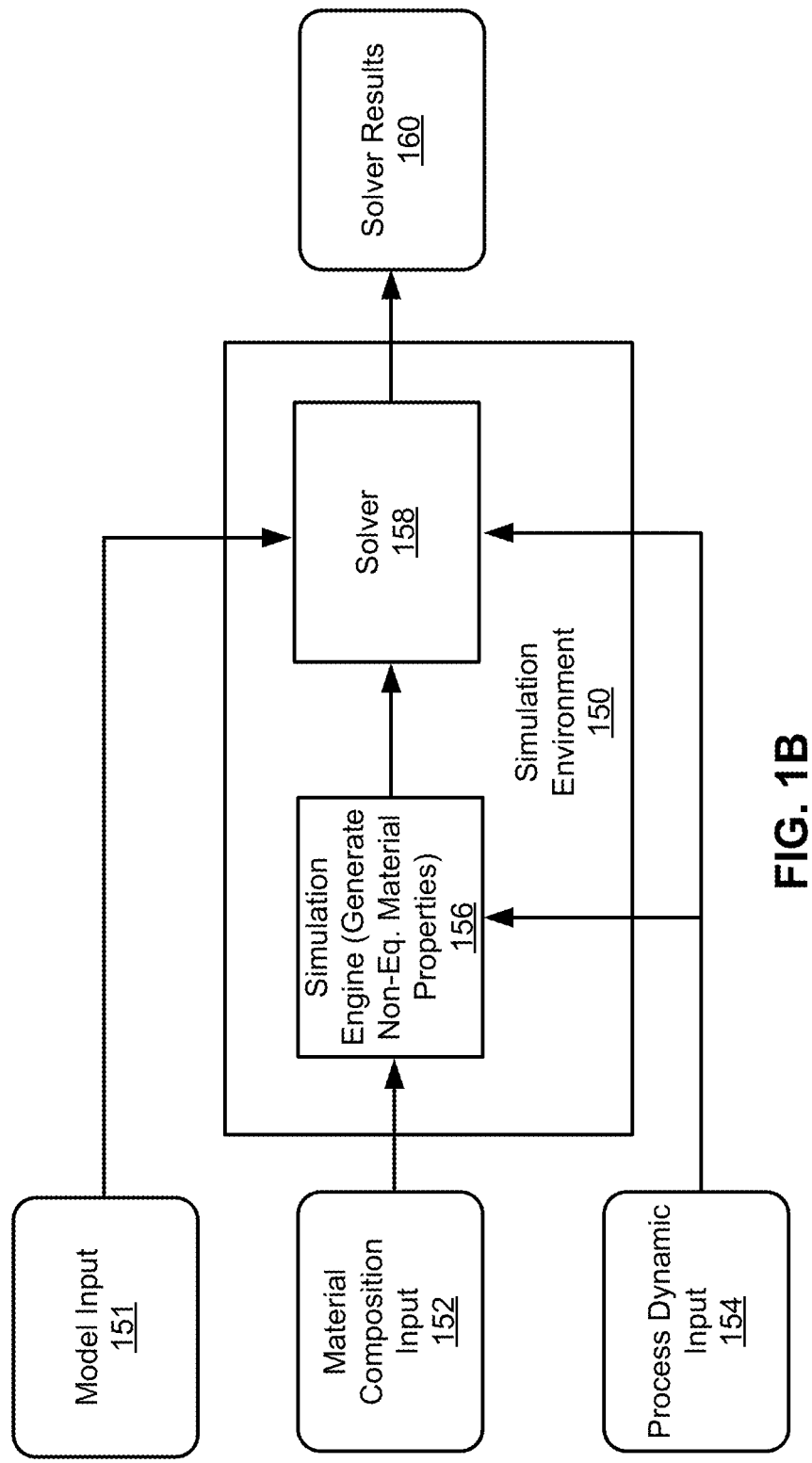
FIG. 1B is a block diagram illustrating a simulation environment according to one embodiment.

FIG. 1B is a block diagram illustrating a simulation environment according to one embodiment. Simulation environment 150 can represent system 100 of FIG. 1A. Referring to FIG. 1B, simulation environment 150 can receive a model, a material composition for the model, and process dynamics for a manufacturing process to perform a thermal and/or structural simulations for the manufacturing process. In one embodiment, simulation environment 150 can include a simulation engine 156 and solver 158 (such as a finite-element-solver). Simulation engine 156 can receive a material composition 152 of a material and process dynamics 154 to derive both equilibrium and non-equilibrium material properties for a manufacturing process using the material. Solver 158 can receive model 151, and the results from simulation engine 156. Solver 158 can then perform a thermal and/or a structural finite element analysis for the model with the specified material composition based on the derived equilibrium and non-equilibrium material properties to generate solver results 160.

Figure 1C:
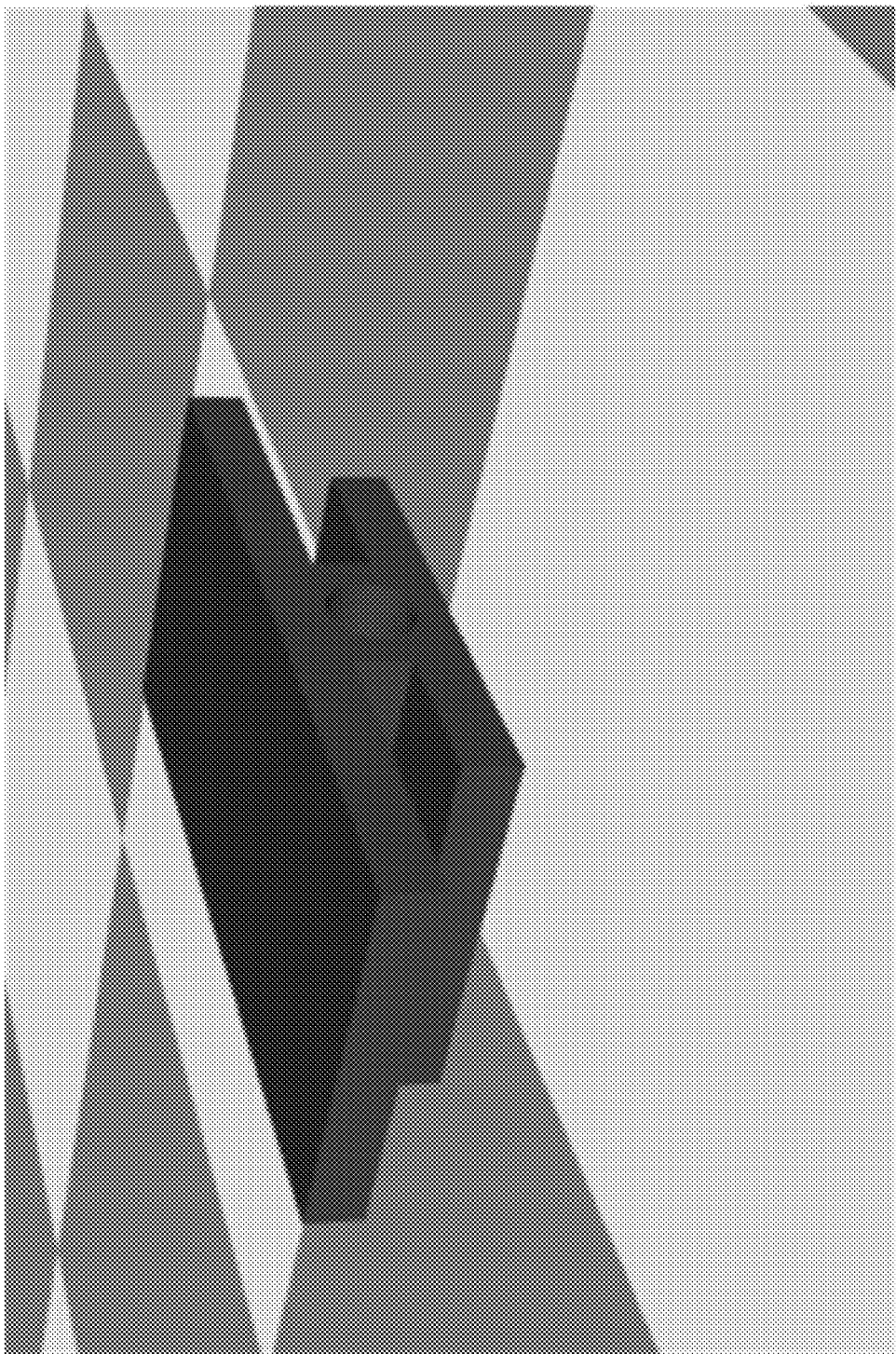
FIG. 1C is a block diagram illustrating an example of a model to be manufactured by an additive manufacturing process according to one embodiment.
Figure 1D:
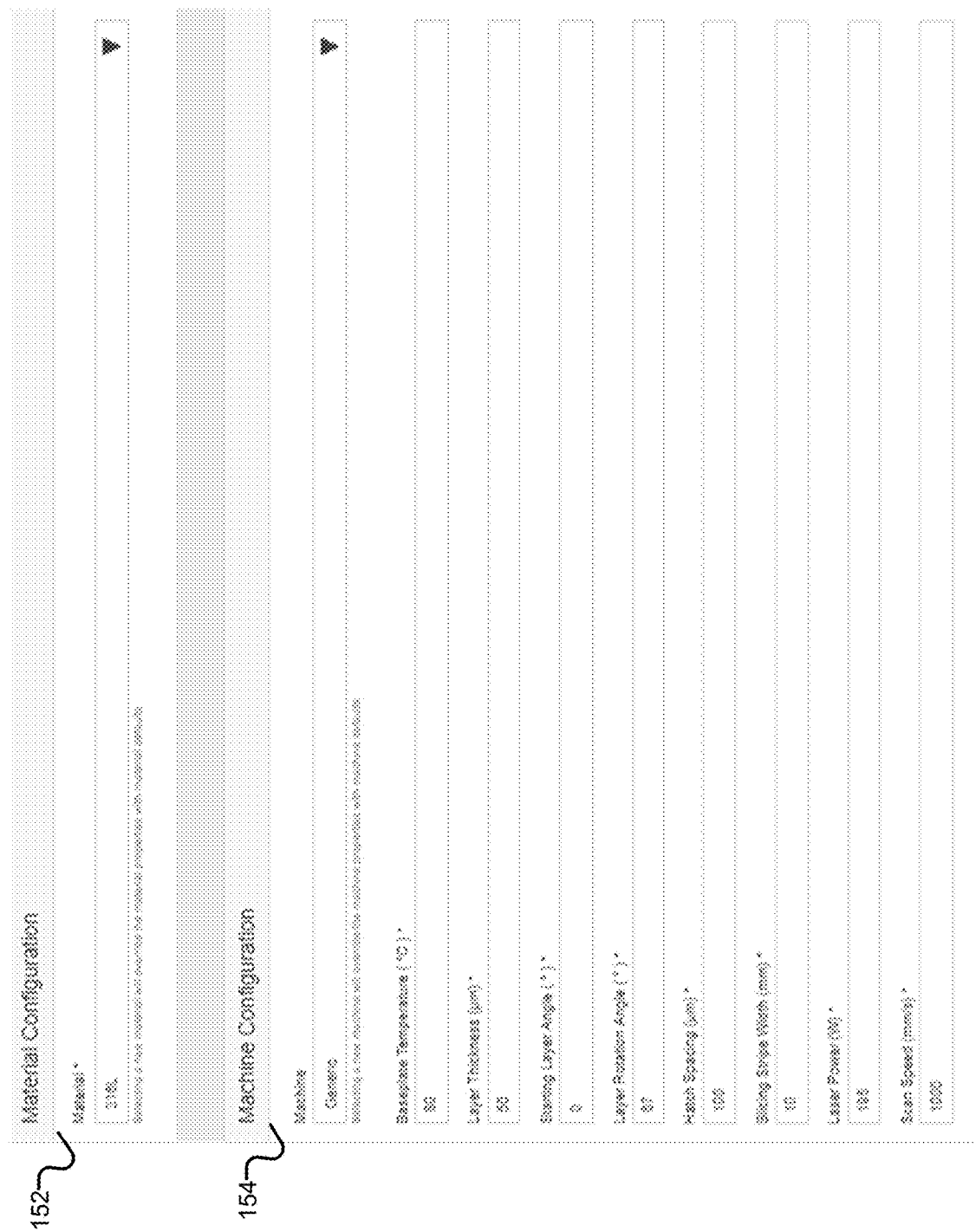
FIG. 1D is a block diagram illustrating an example of a material composition and process dynamic configured for the additive manufacturing process of FIG. 1C.

FIG. 1C is a block diagram illustrating an example of a model to be manufactured by an additive manufacturing process according to one embodiment. Model 151 can be specified by a computer-aided design program or any drawing tools. FIG. 1D is a block diagram illustrating an example of a material composition and process dynamic configured for the additive manufacturing process of FIG. 1C.

Figure 2:
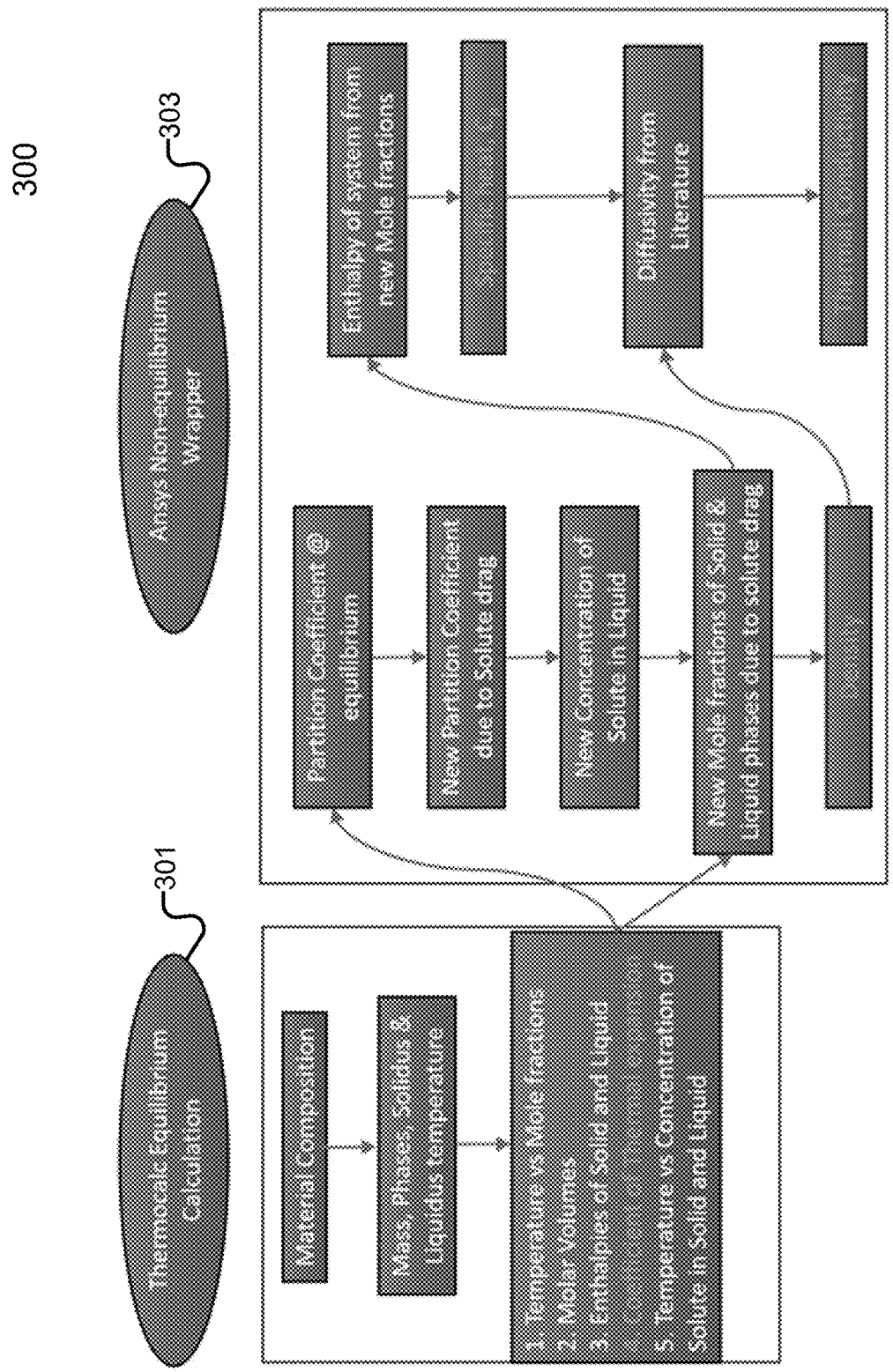
FIGS. 2-3 are flow charts for an example calculation of non-equilibrium thermophysical property values according to one embodiment.
Figure 3:
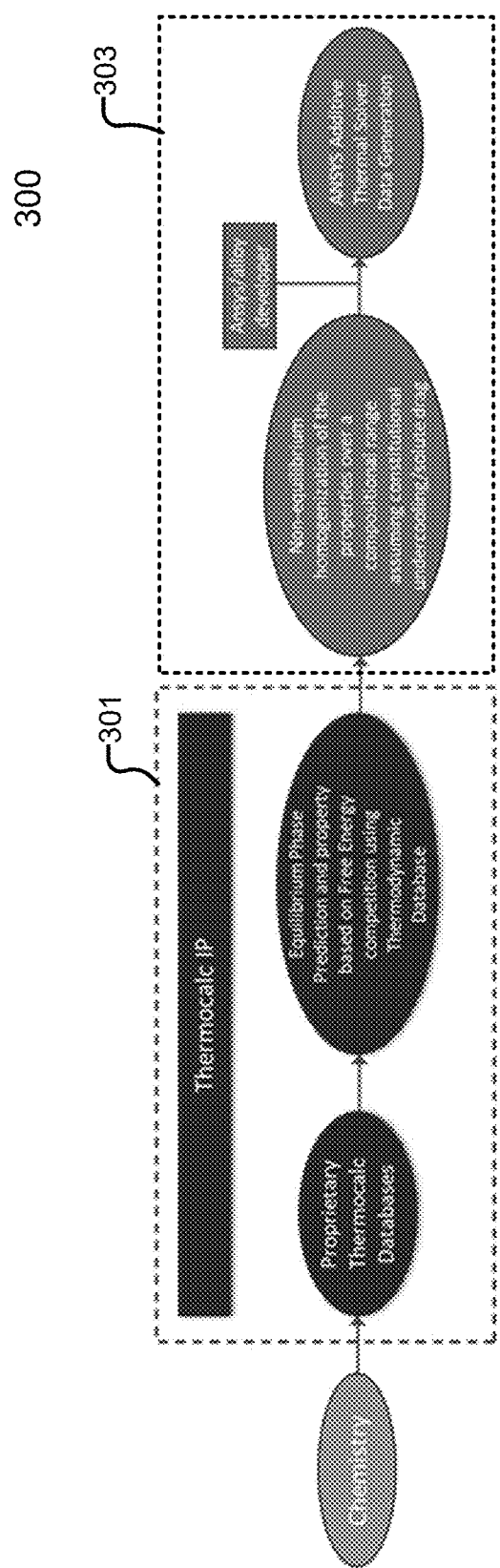

FIGS. 2-3 are block diagrams illustrating a process flow for calculating non-equilibrium thermophysical property values according to one embodiment. The non-equilibrium calculations can be performed by system 104 of FIG. 1A or simulation engine 156 of FIG. 1B. Referring to FIGS. 2-3, block 300 includes equilibrium calculation 301 (e.g., equilibrium calculation using Thermocalc for a specified material composition) and non-equilibrium wrapper 303 (e.g., non-equilibrium calculations using an ANSYS non-equilibrium API wrapper). A wrapper may include a computer program or a software library to call or invoke another executable code or subroutine via a function or API (application programming interface). The wrapper API allows a user to call a non-equilibrium calculation module (such as module 401 of FIG. 4) to calculate non-equilibrium thermophysical property values. The non-equilibrium API wrapper 303 (correspond to operations 8-17, as described below) can receive inputs from Thermocalc equilibrium calculations 301 (correspond to operations 1-7, as described below). Examples of the inputs to wrapper 303 include partition coefficient at equilibrium, $K_e$, slope of Concentration versus Temperature for the liquid state denoted using $$\left(\frac{dC_L}{dT}\right),$$

$C_{L@liqudus\_temp}$, enthalpies of the liquid and solid phases, and any outputs from a thermophysical calculation at equilibrium.

The first concern embodiments of the disclosure addresses is the computation of realistic process-specific thermophysical properties which could be used by finite element solvers in an automatic and efficient fashion. The second concern embodiments of the disclosure addresses is to accurately compute the effects of process dynamics for the thermophysical properties. The third concern embodiments of the disclosure addresses is to correct for the uneven nature of predicted thermophysical properties from first principles.

Figure 4:
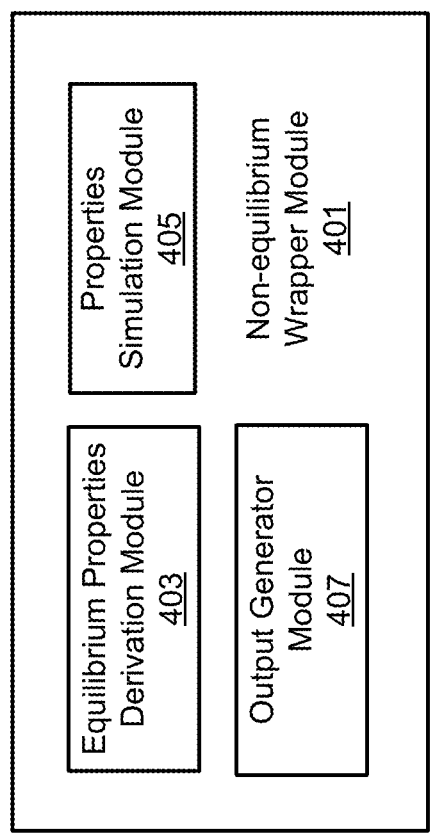
FIG. 4 is a block diagram illustrating an example of a non-equilibrium wrapper module according to one embodiment.

FIG. 4 is a block diagram illustrating an example of a non-equilibrium wrapper module according to one embodiment. Wrapper module 401 can be performed by any of user 102, server 106, system 104 of FIG. 1A, or simulation environment 150 of FIG. 1B. Wrapper module 401 can generate non-equilibrium thermophysical properties of a material given a composition of the material and characteristics of manufacturing process(es) to be applied to the material. Referring to FIG. 4, in one embodiment, wrapper module 401 includes equilibrium properties derivation module 403, properties simulation module 405, and output generator module 407. Equilibrium properties derivation module 403 can receives a material composition of a material as inputs and generate thermophysical material properties at equilibrium for the material. Equilibrium properties derivation module 403 may be performed by a third party software such as Thermocalc using a CALPHAD methodology. Properties simulation module 405 can receive inputs for a manufacturing process (e.g., laser scanning speed, or speed of the power source for the manufacturing process) and calculate the thermophysical material properties at non-equilibrium by simulating or approximating the non-equilibrium state of the material for the manufacturing process. Output generator module 407 can generate the non-equilibrium thermophysical material properties represented in various structures, such as a table or other applicable formats for data transmission or output display, etc. The output data can also be post-processed by a smoothing function. The formatted output data can be subsequently used by a finite element solver to simulate the manufacturing process.

About Thermocalc

Thermocalc is a software package used to perform thermodynamic and phase diagram calculations for multi-component systems. The calculations are based on thermodynamic databases produced by expert evaluation of experimental data using the CALculation of PHAse Diagrams (CALPHAD) method.

The CALPHAD Methodology

CALPHAD is used as an abbreviation for CALculation of PHAse Diagrams but was later expanded to refer to Computer Coupling of Phase Diagrams and Thermochemistry.

For the CALPHAD methodology, experimental and theoretical information for phase equilibria and thermochemical properties of a system are collected. The thermodynamic properties of each phase are then described through the Gibbs free energy, applying a mathematical model containing adjustable parameters. These parameters are evaluated by optimizing a fit of the model to the assessed information, also involving coexisting phases. Thereafter, the phase diagram is calculated, as well as the thermodynamic properties of all the phases in the phase diagram and the system as a whole.

The CALPHAD method can be performed to obtain a consistent description of the phase diagram and the thermodynamic properties to reliably predict the set of stable phases and their thermodynamic properties in regions without experimental information and for metastable states during simulations of phase transformations.

Generally, temperature dependent thermophysical material properties at equilibrium are used as inputs for thermal simulations for thermal analysis of the material. The non-equilibrium thermophysical material properties can be generated using a thermodynamic and phase diagram approach (such as Thermocalc) to simulate (or represent, approximate) non-equilibrium states of the materials in manufacturing processes such as additive manufacturing. These properties can be used as inputs to existing thermal solvers for simulation for predictive design and control of the processes.

Thermophysical properties play an important role in predictive design and control of manufacturing processes as these thermophysical properties can be used in a simulation solver to predict results of the processes prior to implementation. A good finite element simulation requires accurate, process-specific properties for accurate predictions.

In one embodiment, the non-equilibrium thermophysical material properties can be tabulated into a thermophysical process-specific property database or look up table and where the material properties include coefficient of thermal expansion, density, specific heat, and/or thermal conductivity. These material properties can then be used by Finite Element Solvers to solve integrated computational materials engineering (ICME) problems.

The ICME problems can be applied in simulating manufacturing processes including additive manufacturing, spat Cooling, welding, hot forming, casting, etc. In one embodiment, a non-equilibrium Schiel-Gulliver formulation with CALPHAD approaches is used with a Solute drag formulation to generate the non-equilibrium thermophysical material properties. Solute drag can be employed for providing hindrance to the solid-liquid interface of the material in non-equilibrium from achieving a steady state motion (for example in metal additive manufacturing) where cooling is extremely rapid.

Embodiments disclose systems and methods for a process-specific CALPHAD-based thermophysical properties generation for finite element solvers. The generation includes process-specific non-equilibrium phenomena including the solute drag phenomena.

Procedure:

The following is an example procedure to calculate thermophysical property values for 316L Stainless Steel using an equilibrium model (e.g., using Thermocalc) with a non-equilibrium component according to one embodiment. The material properties (e.g., coefficient of thermal expansion, density, specific heat, and/or thermal conductivity) at non-equilibrium can then be used as inputs for thermal simulations. The operations are as follows:

(Please note that operations 2-7 correspond to an equilibrium model approach)

Figure 5:
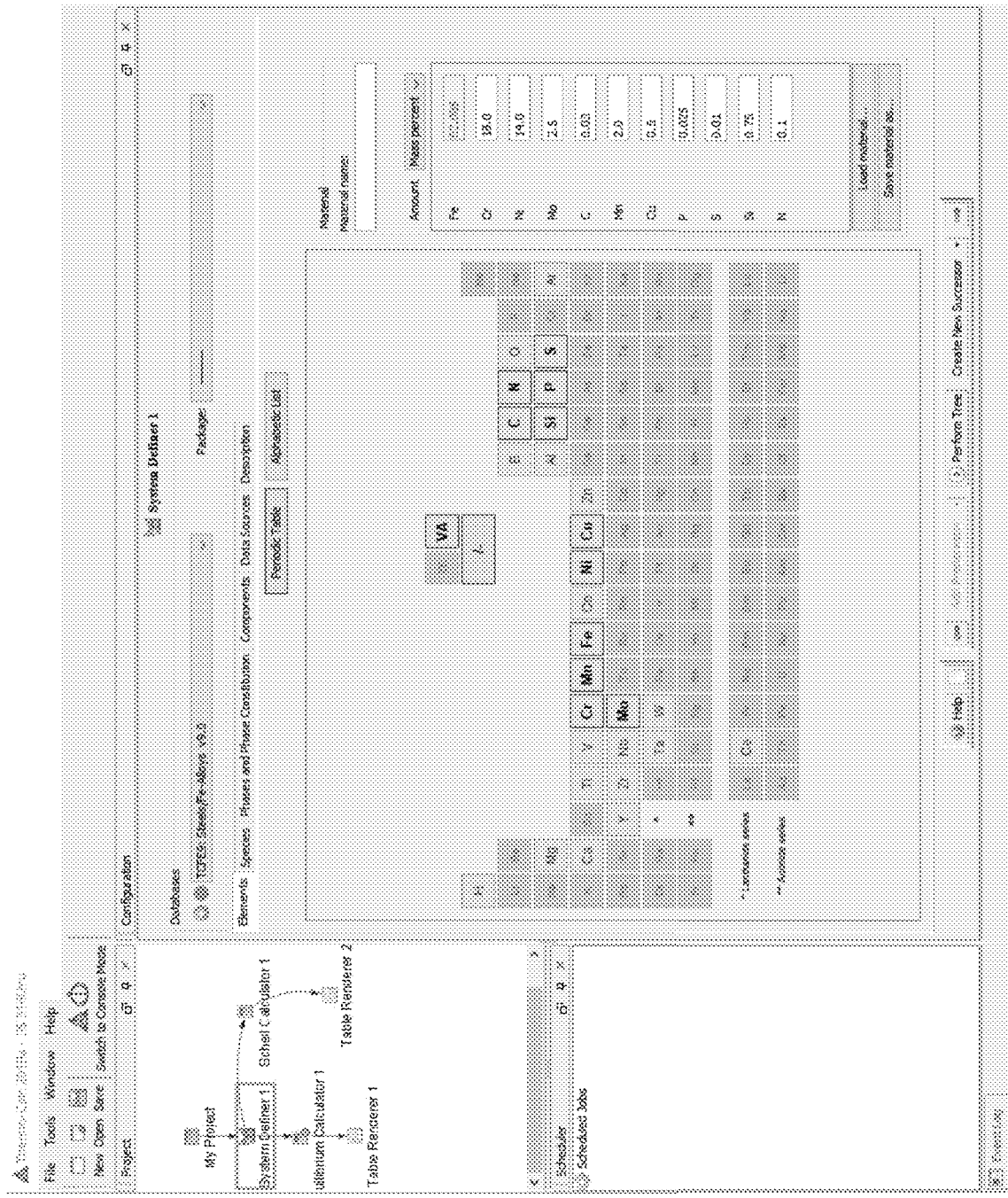
FIG. 5 is a block diagram of material composition inputs for 316L SS according to one embodiment.

Operation 1: The first operation is to obtain the metal powder chemistry for 316L Stainless Steel and then assign the element with the higher weight percentage as the 'database-solvent' material for a baseline equilibrium calculations using Thermocalc. An example of such a study is shown in FIG. 5. In this case, 316L is a steel alloy and so the Fe/Steels materials database is used for the Thermocalc baseline equilibrium calculations.

Figure 6:
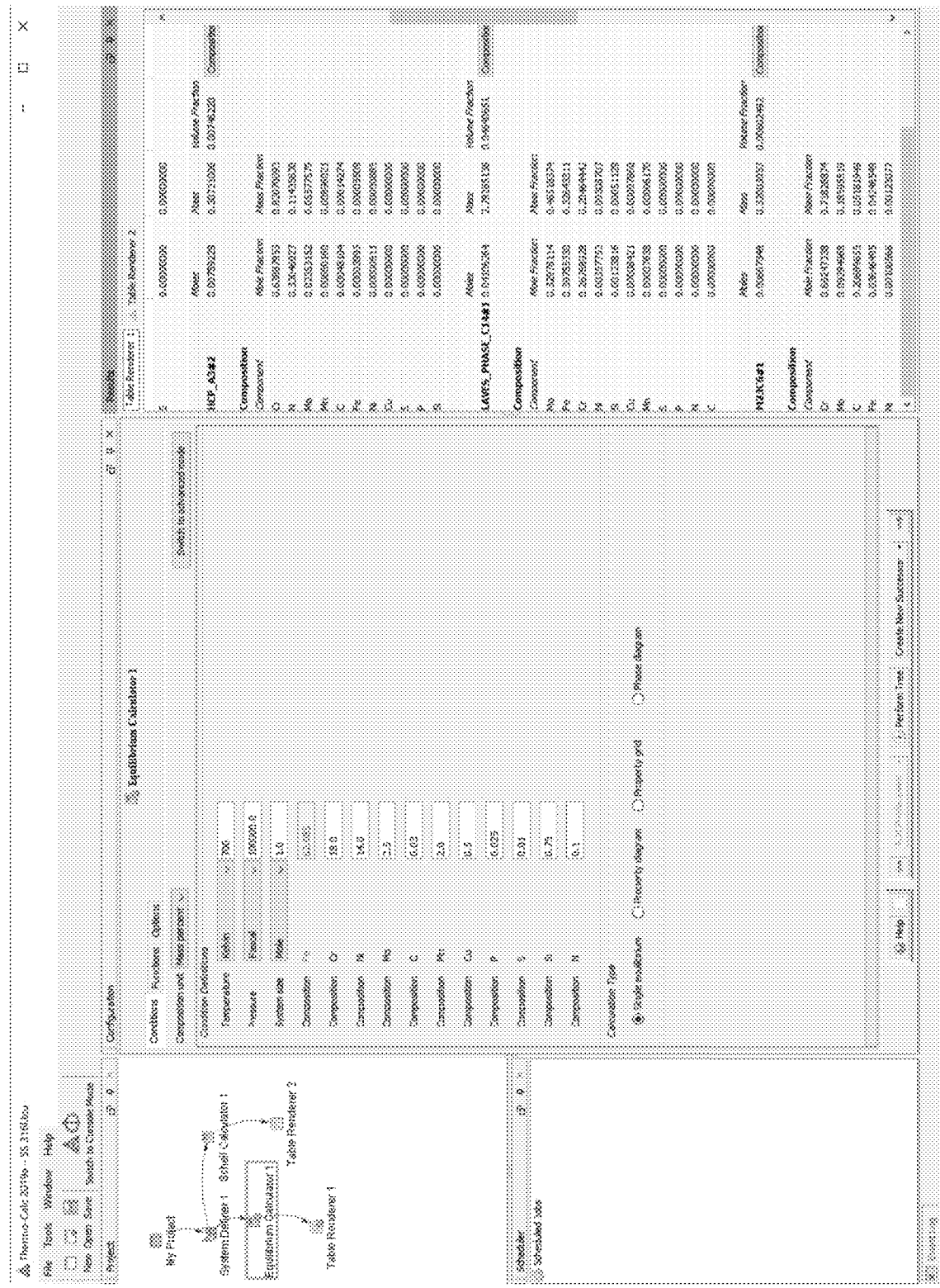
FIG. 6 is a block diagram of calculations for a single point equilibrium calculation for 316L SS according to one embodiment.

Operation 2: The next operation is to perform a single point equilibrium calculation on the material as shown in FIG. 6 to record the phase transition temperatures, system mass as well as solidus and liquidus temperatures for all the phases, as shown in FIG. 7.

Figure 8:
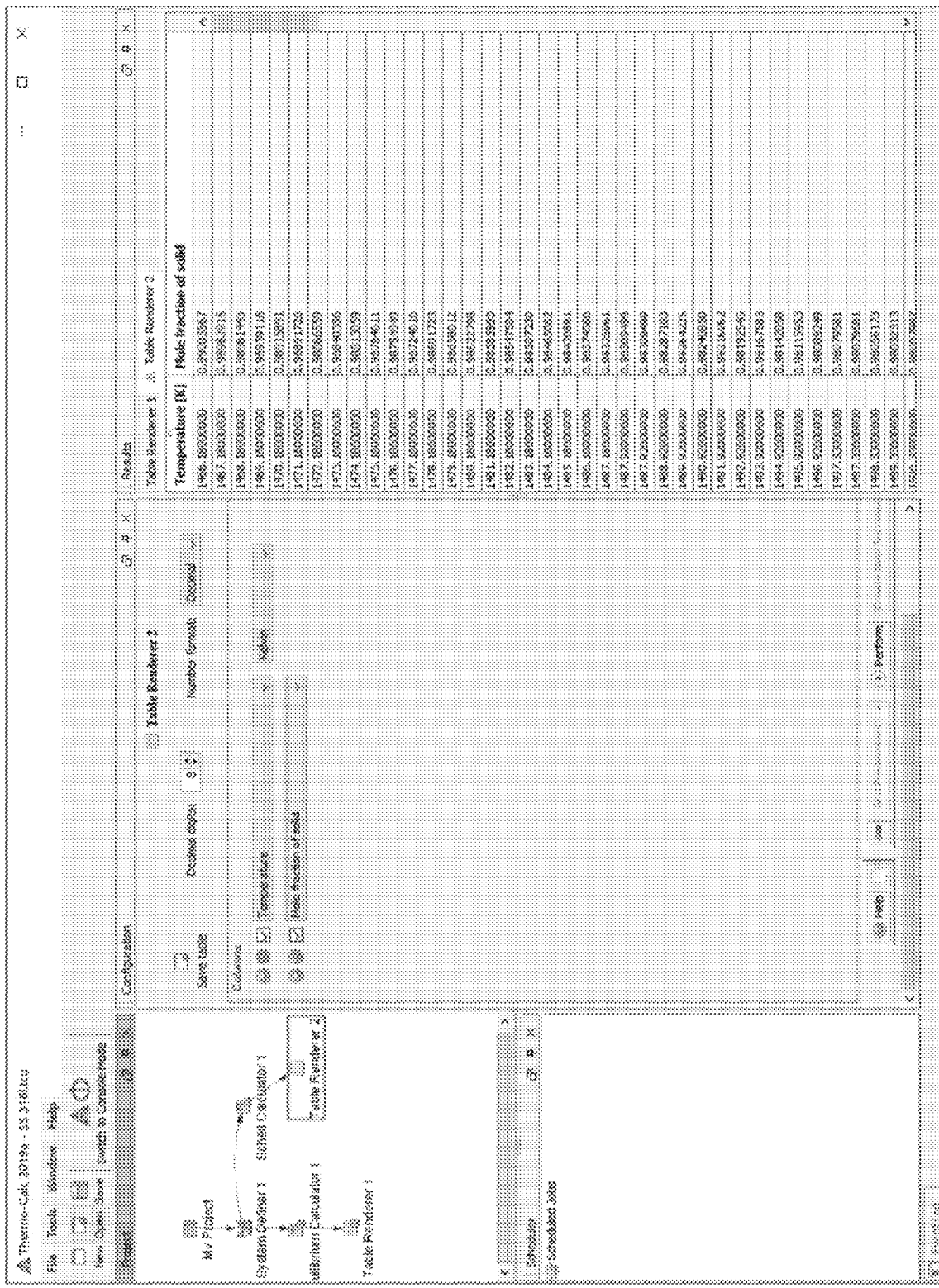
FIG. 8 is a block diagram of calculations for mole fraction of solid versus temperature for 316L SS according to one embodiment.
Figure 9:
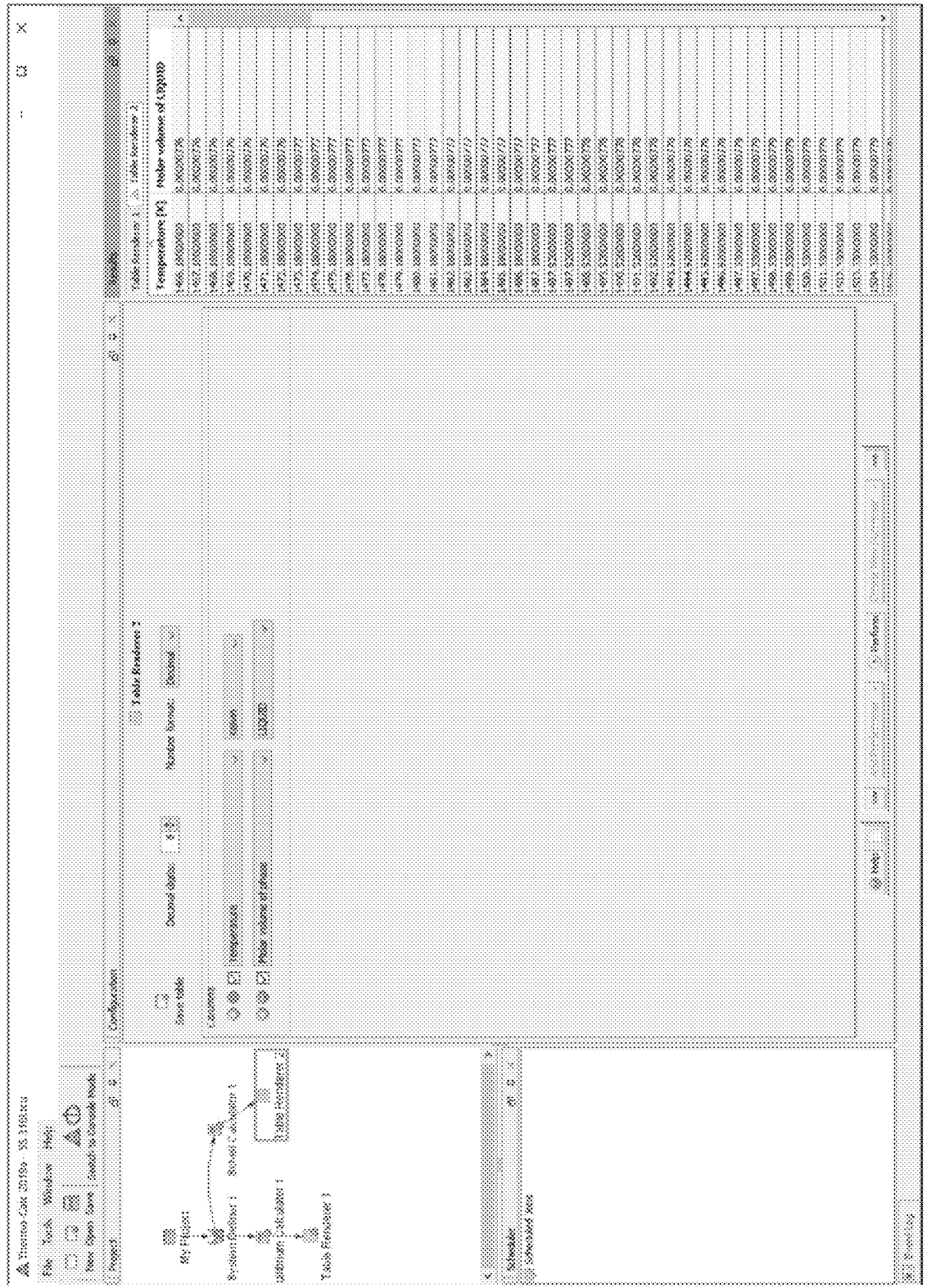
FIG. 9 is a block diagram of calculations for volume fraction of liquid versus temperature for 316L SS according to one embodiment.

Operation 3: Following the equilibrium computation operation, a Scheil-Gulliver (or Scheil) calculation is initiated in Thermocalc. The Scheil calculation is performed to account for the solute redistribution during solidification in the temperature region comprising of a solid-liquid state mixture. By executing this module, the mole and volume fractions of the solid and liquid phases ($f_S$, $f_L$, $v_S$, $v_L$) with respect to temperature are calculated and recorded as could be referred from FIGS. 8 and 9 respectively for 316L SS.

Operation 4: In addition to the solvent, the solute can be identified. In one embodiment, the element having the second lowest in mass percentage in the overall alloy chemistry is identified as the solute (e.g., chromium, see FIG. 5).

Operation 5: The concentration of solute in liquid ($C_L$) and the concentration of solute in solid ($C_S$) are calculated using the law of conservation of mass. The equation used to compute $C_S$ can be $$C_S = \frac{C_O - C_L * f_L}{f_S},$$

where $f_S$, $f_L$ are me mole fractions of solid and liquid respectively and $C_O$ denotes the overall percent composition of the solute in the alloy.

Operation 6: This operation computes the slope of Concentration versus Temperature for the liquid state denoted using $$\left(\frac{dC_L}{dT}\right).$$

Operation 7: The Scheil partition coefficient at equilibrium (e.g., $K_e$) which describes solute redistribution during solidification of an alloy, is computed based on the concentrations of the solute in solid and liquid, using the equation $$K_e = \frac{C_S}{C_L}.$$

In summary, for the above example of 316L SS, a pseudo-binary solute drag system (pseudo-binary refers to an approach that models a system two components at a time even though the system may include many more components. E.g., for a three component system ABC, one can model the system through the combinations of AB, BC, or CA since there could be three combinations for the two components) is used with chromium (Cr) as the solute and iron (Fe) as the solvent to calculate thermophysical material properties for 316L SS. For operations 1-7, the concentration of the solute (e.g., chromium) in liquid is computed and recorded with respect to various temperature settings. The concentration of chromium in solid and the partition coefficient at equilibrium ($K_e$) are then calculated. Although the above calculations are shown using Thermocalc, other thermal analysis software tools or textbook can be used instead of Thermocalc.

(Please note that operations 8-12 correspond to non-equilibrium computations performed based on the previous equilibrium computations).

Operation 8: Due to a rapid solidification under an assumption that solute drag occurs, a new partition coefficient (K) due to solute drag can be calculated, using an equation of the form $$K = \frac{K_e + \left(\frac{V}{V_d}\right)}{1 + \left(\frac{V}{V_d}\right)},$$

where $K_e$ is the equilibrium partition coefficient, V is the Interface velocity (e.g., speed at the solid/liquid interface) and $V_d$ is the interface diffusion velocity (speed of diffusion at the solid/liquid interface). Note that, the new partition coefficient (K) calculation may be specific to a particular manufacturing process. For example, K can be dependent on a speed at which the material is being heated/cooled for the particular manufacturing process. Since K is dependent on the interface velocity, V, thus the Interface velocity, V, can be assumed to approximate a speed of a laser or a scanner guiding the laser in an additive manufacturing process (in which a power source (e.g., a laser) is directed at a material to heat and melt a solid form of the material). In one embodiment, the ratio of $V/V_d$ is approximately 0-10. In another embodiment, an average laser speed is about 1.0 meters/second, and the ratio of $V/V_d$ is approximately 1.1.

Operation 9: Furthermore, a change in concentration of the solute in liquid (new slope) is calculated using an equation of the form $$\frac{dC_{L\_new}}{dT} = \frac{dC_L}{dT} * \left(1 - K + \left(K * \frac{\ln\left(\frac{K}{K_e}\right)}{(1 - K_e)}\right)\right).$$

This equation for the non-equilibrium slope is calculated based on the previously calculated slope, $$\left(\frac{dC_L}{dT}\right),$$

partition coefficient ($K_e$) and solute drag partition coefficient (K).

Operation 10: Because the concentration at liquidus temperature is equal to the percentage composition of the solute in liquid, and the new slope accounts for the change in concentration per unit change in temperature, a new concentration for the solute in liquid above the liquidus temperature can be obtained using the formula $$\left(C_{L\_new} = C_{L@liqudus\_temp} - \left(\frac{dC_{L\_new}}{dT}\right)\right),$$

where $C_{L@liqudus\_temp}$ is the solute in liquid concentration at liquidus, and $$\frac{dC_{L\_new}}{dT}$$

is the change in concentration of the solute in liquid for unit change in temperature. Variations of the concentration of solute in liquid can be identified with respect to various temperatures based on a change in concentration ($dC_{L\_new}$) with a corresponding concentration ($C_{L\_new}$.)

Operation 11: Assuming that $$\frac{dC_{S\_new}}{dC_S}$$

is constant, a new mole fraction of solid ($f_{S\_new}$) due to solute drag can be calculated by the equation, $$f_{S\_new} = \frac{(C_O - C_{L\_new})}{(C_S - C_{L\_new})},$$

based on the law of the conservation of mass. Once a new mole fraction of solid ($f_{S\_new}$) is obtained, the new mole fraction of liquid can be computed by the equation, $f_{L\_new} = (1 - f_{S\_new})$.

Operation 12: Furthermore, after the mole fractions are obtained, the density which is given by, $$\frac{\text{Mass}}{\text{Volume}},$$

can be calculated, where Mass is a mass of the system and Volume is a volume of the system. Here, Mass is already available from the earlier equilibrium Thermocalc calculations. The volume of the system could be computed by, Volume=$f_{S\_new} * v_S + f_{L\_new} * v_L$, where $v_S$ and $v_L$ are the volume of solids and liquids of the system respectively.

Figure 10:
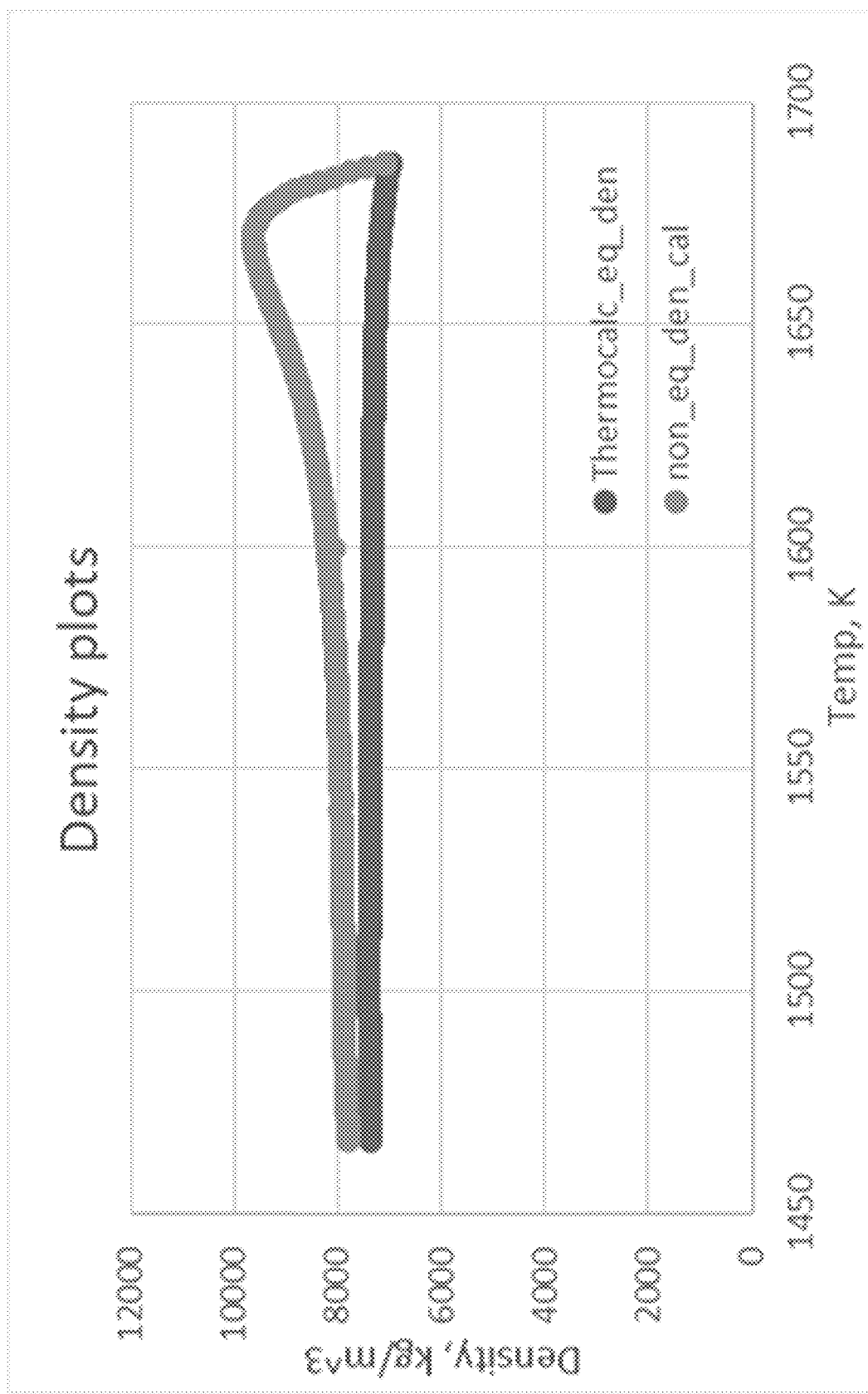
FIG. 10 is a plot of equilibrium and non-equilibrium densities versus temperature according to one embodiment.

Operation 13: For the 316L SS example, please refer to the plot provided in FIG. 10 comprising of equilibrium and nonequilibrium values of density with respect to temperature. This operation tabulates the density values for a range of temperatures. In other words, the operation establishes a tabular relationship between the density value and the temperature. The differences in the respective curves can be attributed to the solute drag from rapid solidification.

Figure 11:
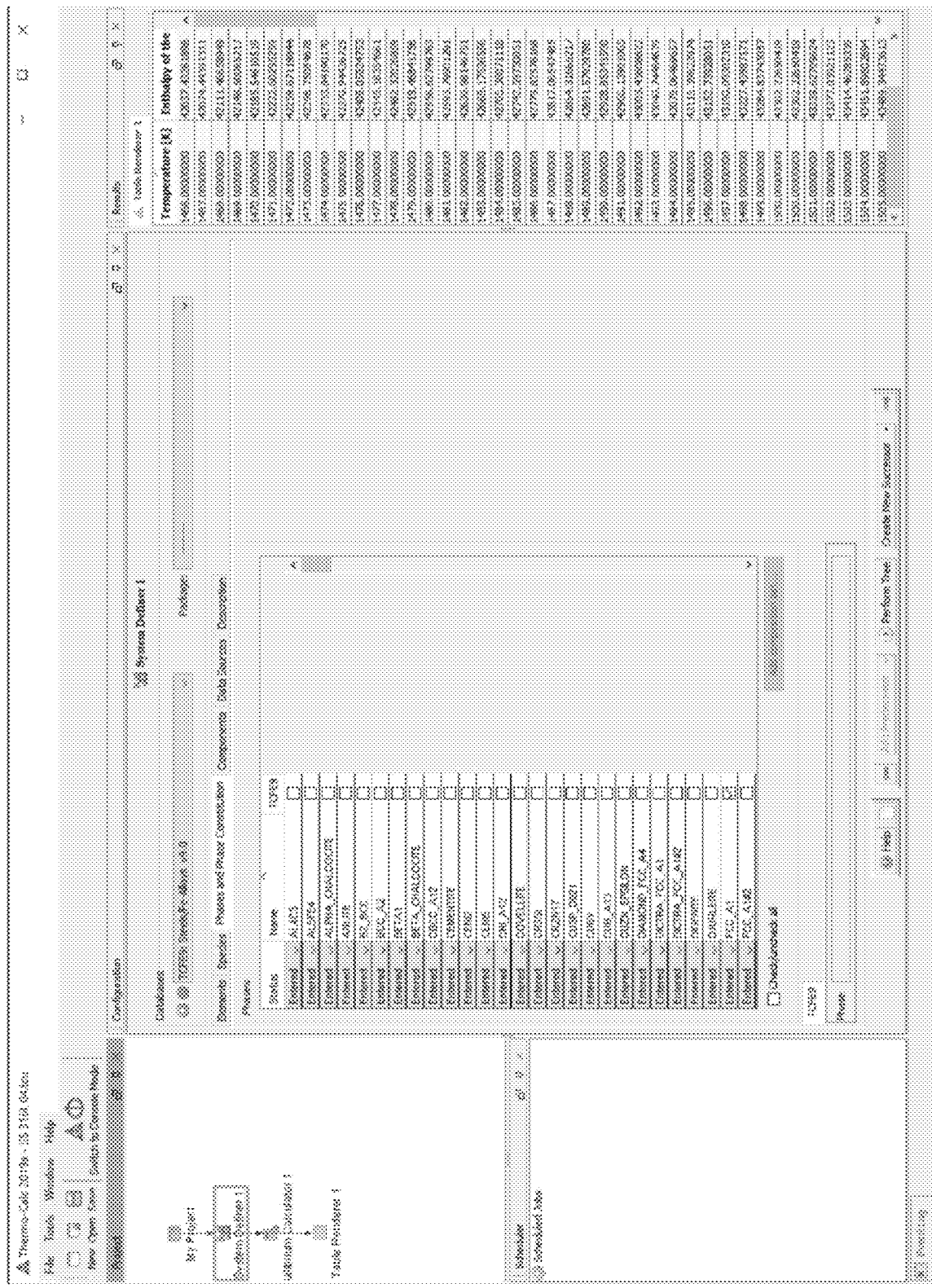
FIG. 11 is a block diagram of calculations for enthalpy of solid versus temperature for 316L SS according to one embodiment.

Operation 14: To calculate specific heat, e.g., an amount of heat per unit mass required to raise the temperature by one degree Celsius, enthalpies of the solid and liquid phases (as seen in FIG. 11 for 316L SS) are first calculated individually. For example, solid and liquid phases for a respective temperature range can be selected in Thermocalc for simulation and generation of enthalpy values. In another embodiment, the enthalpy of each phase (solid, liquid) versus temperature can be simulated individually for each of the phases, then the enthalpy can be multiplied with the mole fractions for the respective phase to generate the enthalpy values for the system.

Operation 15: After the temperature versus equilibrium enthalpies of the independent solid and liquid phases ($H_S$, $H_L$) in the solid/liquid (mushy) zone are calculated, the enthalpy of the system could be expressed as $H_{sys} = f_{S\_new} * H_{S\_new} * H_L$. The specific heat could be computed using the equation $$C_p = \frac{\Delta H}{\Delta T}.$$

Figure 12:
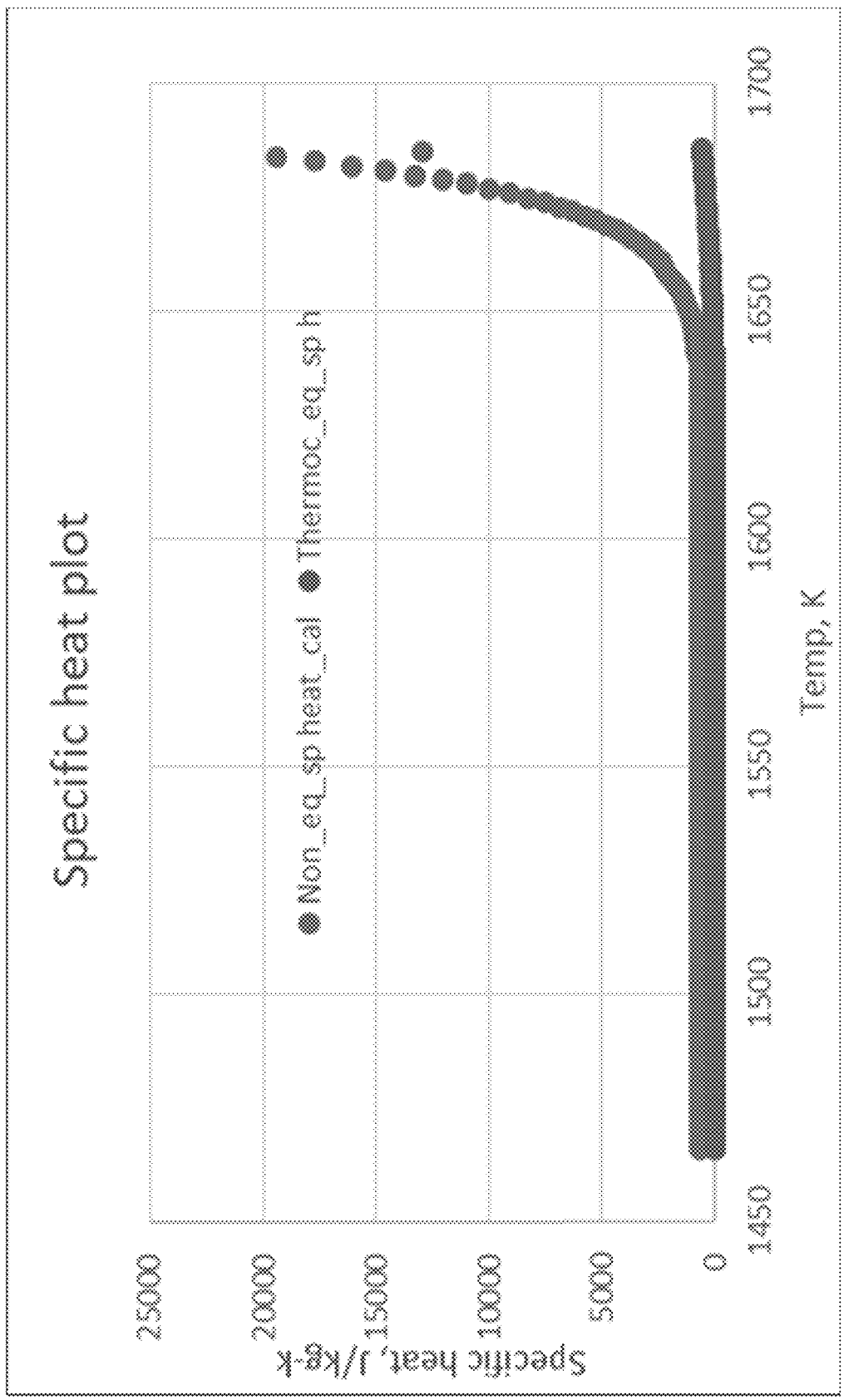
FIG. 12 is a plot of equilibrium and non-equilibrium specific heat versus temperature for 316L SS according to one embodiment.

The $\Delta H$, in the numerator, can be obtained by taking a difference of $H_{sys}$ at two consecutive temperature points, e.g., $\Delta T$. FIG. 12 is an example of the specific heats for 316L SS calculated by Thermocalc equilibrium and a non-equilibrium approach (using $f_{S\_new}$ and $f_{L\_new}$ based on solute drag) according to one embodiment.

Figure 13:
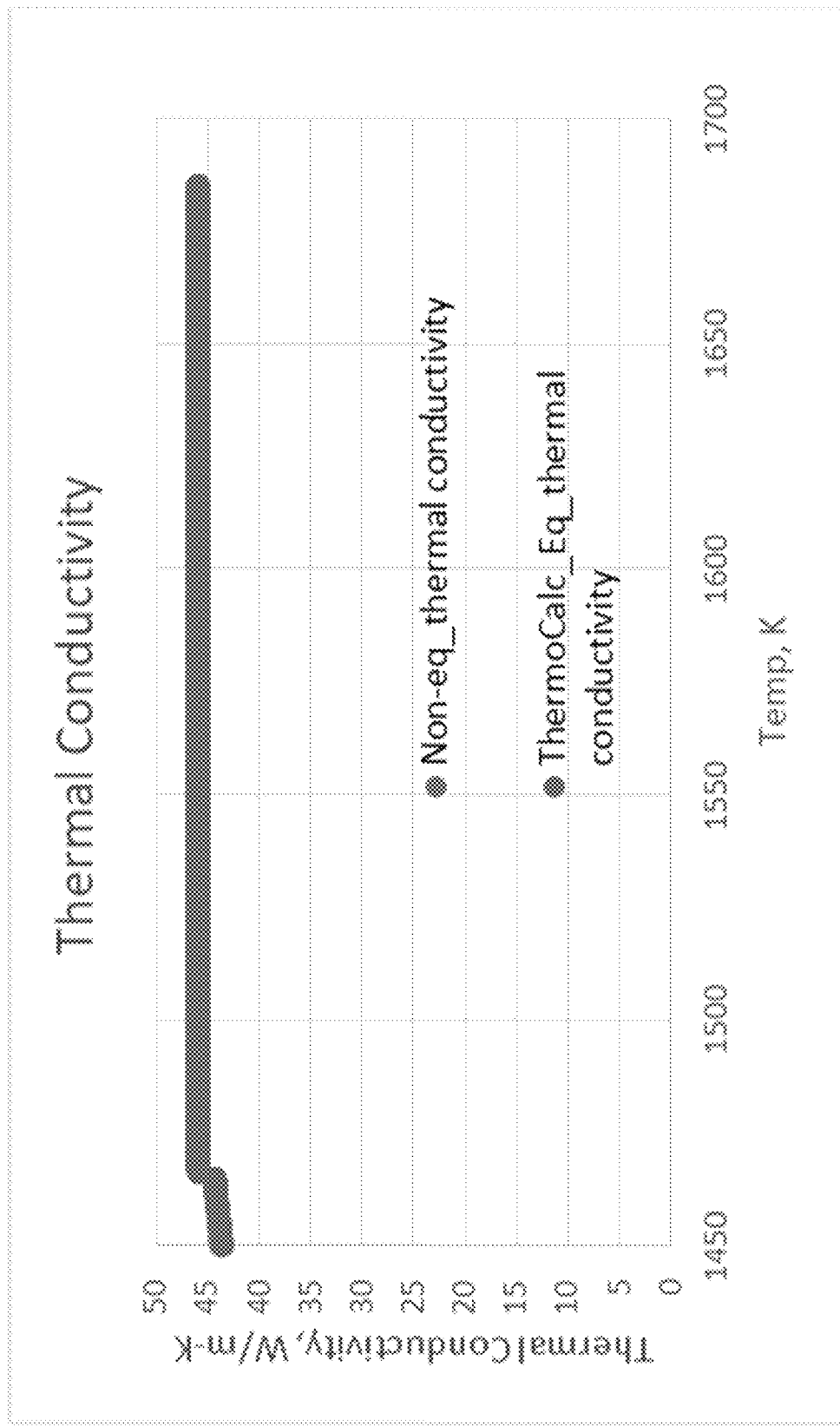
FIG. 13 is a plot of equilibrium and non-equilibrium thermal conductivity versus temperature for 316L SS according to one embodiment.

Operation 16: To calculate thermal conductivity, thermal diffusivity is generated using Thermocalc. Given non-equilibrium densities and specific heat (as previously calculated), therefore, thermal conductivity can be calculated as: thermal diffusivity*density*specific heat. FIG. 13 is an example plot for thermal conductivity for 316L SS according to one embodiment.

Figure 14:
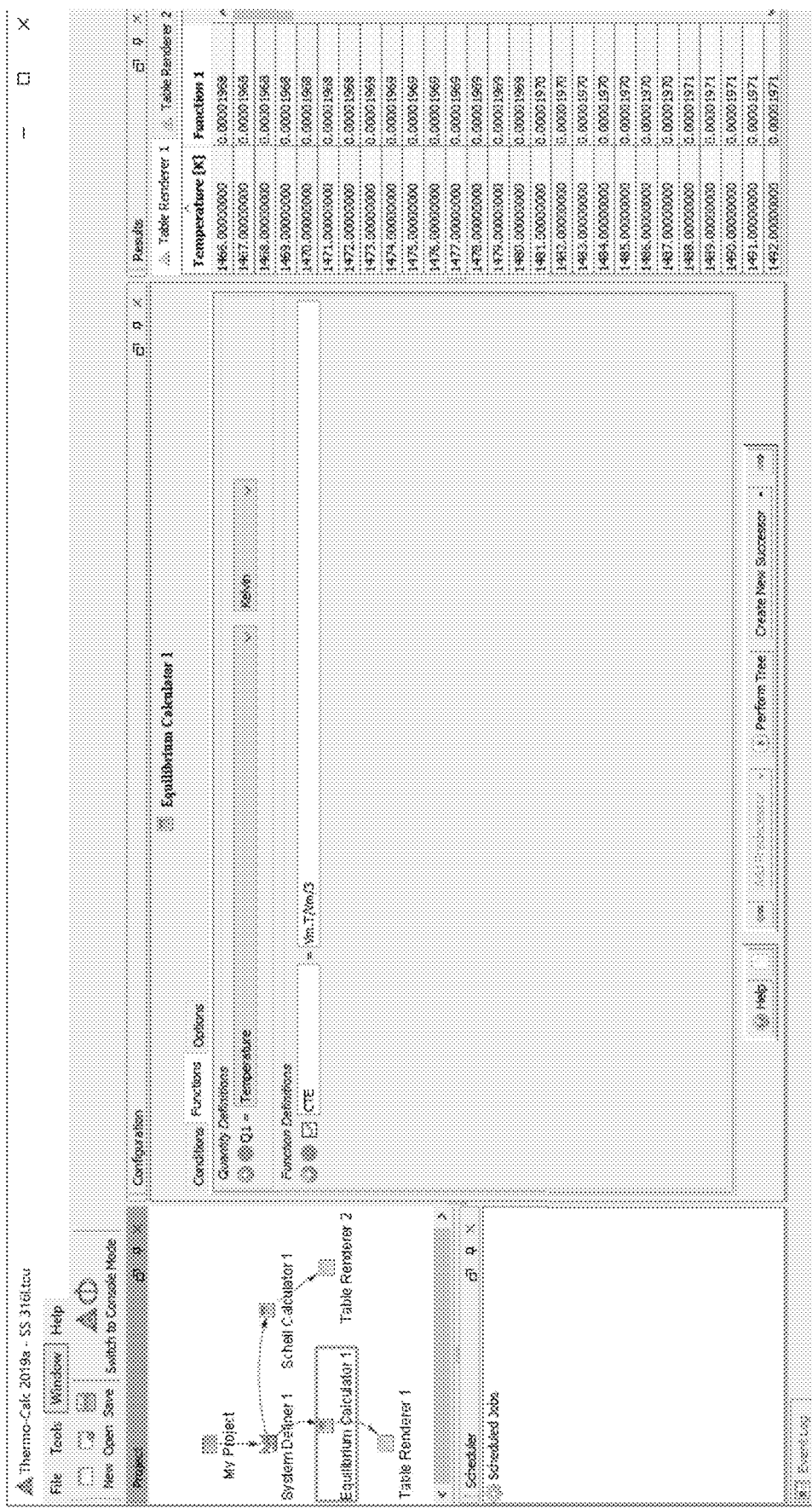
FIG. 14 is a block diagram of calculations for coefficients of thermal expansion versus temperature for 316L SS according to one embodiment.

Operation 17: The coefficients of thermal expansion are recorded directly from equilibrium Thermocalc calculation as one third of the slope for the change in molar volume with respect to change in temperature divided by the molar volume at that temperature. FIG. 14 shows an example of the coefficients of thermal expansion calculations using Thermocalc.

After the above operations are performed, the calculated thermophysical properties (e.g., coefficients of thermal expansion, density, specific heat, and/or thermal conductivity) can be stored in a lookup table to be used by a finite element solver to simulate the manufacturing process. In one embodiment, the thermophysical property values are readjusted and smoothened based on boundary values at solidus and liquidus. An example formula for the above smoothening calculation can be: P=P_S+(P_L−P_S)*(T−T_s)/(T_L−T_s), where P is the value of the thermophysical property at Temperature T, P_s is the value of the property at solidus temperature T_s, P_L is the value of the property at liquidus temperature T_L, and (P_L−P_s)/(T_L−T_s) is the average gradient. In one embodiment, the calculated thermophysical properties are temperature dependent properties. Here, the finite element solver based simulation can simulate different scenarios for a manufacturing process, such as simulation scenarios for different laser speed, laser power, scan speeds, and/or scan patterns for an additive manufacturing process. Here, a specific simulation scenario would access the lookup table to retrieve the calculated thermophysical properties for the material for a temperature range in the specific simulation scenario. The calculated thermophysical properties would model or represent the non-equilibrium thermophysical properties of a material for a manufacturing process with more accuracy.

Figure 15A:
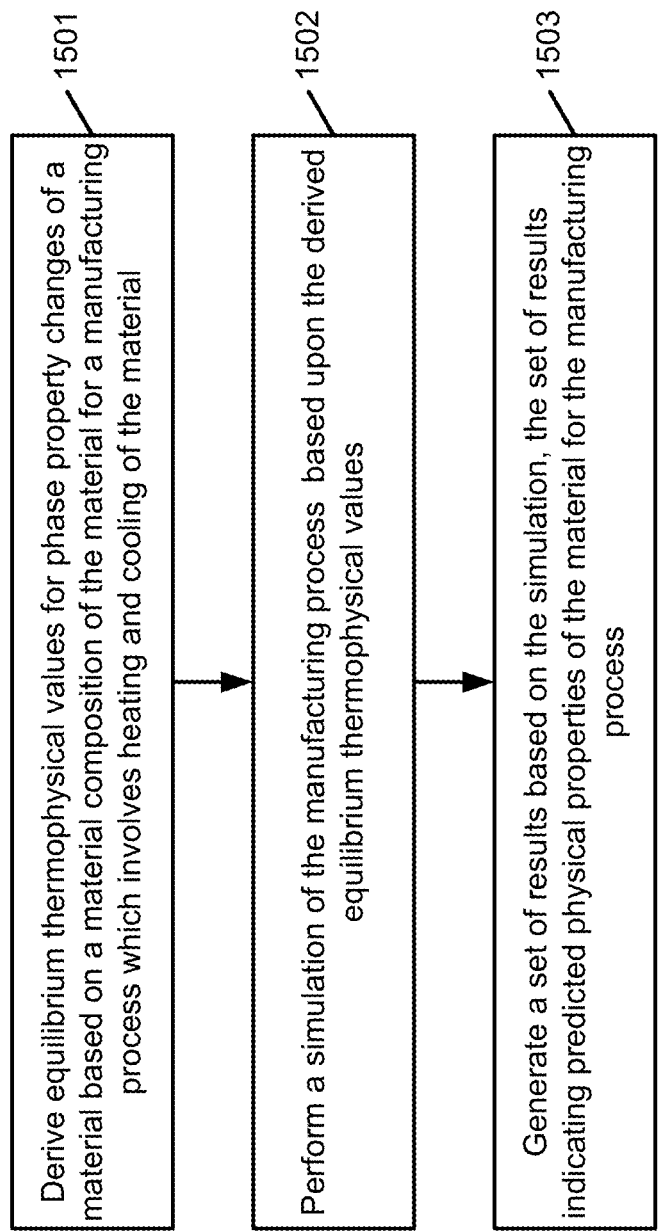
FIG. 15A is a flow diagram for a method according to one embodiment.

FIG. 15A is a flow diagram illustrating an example method according to one embodiment. Process 1500 may be performed by processing logic which may include software, hardware, or a combination thereof. For example, process 1500 may be performed by system 100 or system 150 of FIG. 1B. Referring to FIG. 15A, at block 1501, processing logic derives equilibrium thermophysical values for phase property changes of a material based on a material composition of the material for a manufacturing process which involves heating and cooling of the material. At block 1502, processing logic performs a simulation of the manufacturing process based upon the derived equilibrium thermophysical values. At block 1503, processing logic generates a set of results based on the simulation, the set of results indicating predicted physical properties of the material for the manufacturing process.

Figure 15B:
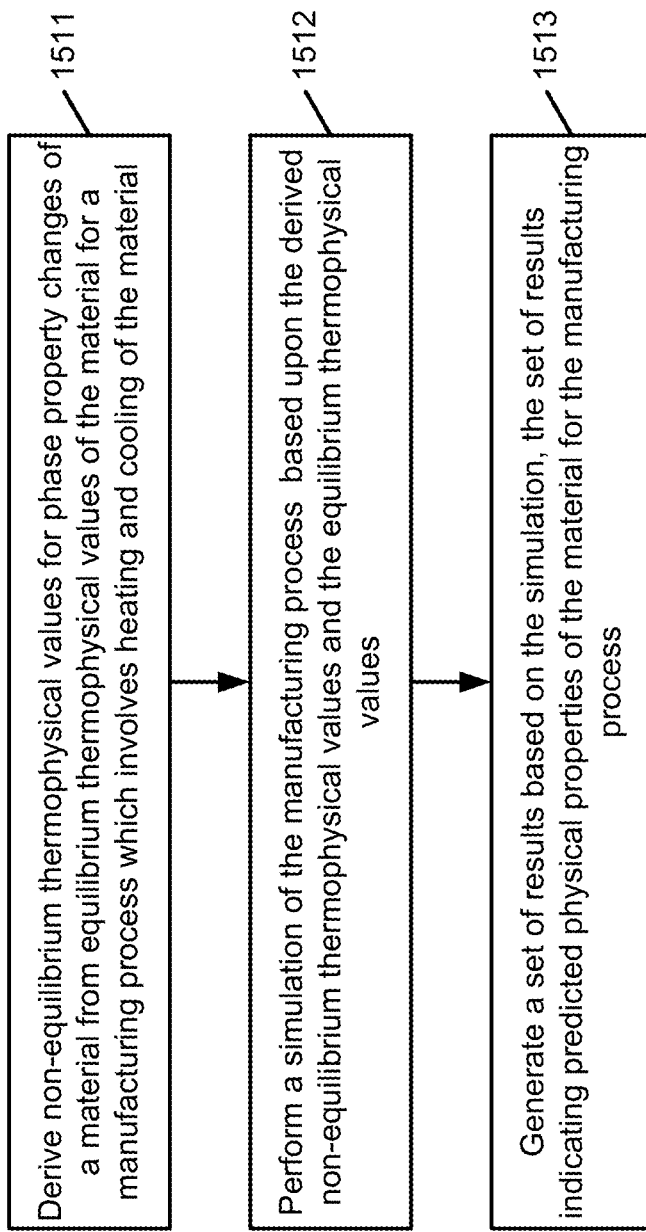
FIG. 15B is a flow diagram for a method according to one embodiment.

FIG. 15B is a flow diagram illustrating an example method according to one embodiment. Process 1510 may be performed by processing logic which may include software, hardware, or a combination thereof. For example, process 1510 may be performed by system 100 or system 150 of FIG. 1B. Referring to FIG. 15B, at block 1511, processing logic derives non-equilibrium thermophysical values for phase property changes of a material from equilibrium thermophysical values of the material for a manufacturing process which involves heating and cooling of the material. At block 1512, processing logic performs a simulation of the manufacturing process based upon the derived non-equilibrium thermophysical values and the equilibrium thermophysical values. At block 1513, processing logic generates a set of results based on the simulation, the set of results indicating predicted physical properties of the material for the manufacturing process.

In one embodiment, the set of outputs based on the simulation is used in a finite element solver to simulate the process. In another embodiment, the process includes a manufacturing process. In another embodiment, processing logic further smooths the non-equilibrium thermophysical property values over a temperature range when the non-equilibrium thermophysical property values encounter a sudden change as function of temperature.

In another embodiment, the smoothing includes calculating an average gradient for each of the non-equilibrium thermophysical property values for the material, and back-calculating the non-equilibrium thermophysical property values based on boundary values at solidus and liquidus for the material to smooth out non-smooth thermophysical property value variations.

In another embodiment, the non-equilibrium thermophysical material property values are tabulated into a thermophysical process-specific property look up table for the finite element solver to access the look up table for process simulation. In one embodiment, the deriving is based on a calculation of phase diagrams approach.

The methods and systems described herein may be implemented using any suitable processing system with any suitable combination of hardware, software and/or firmware, such as described below with reference to the non-limiting examples of FIGS. 16A-16C.

Figure 16A:
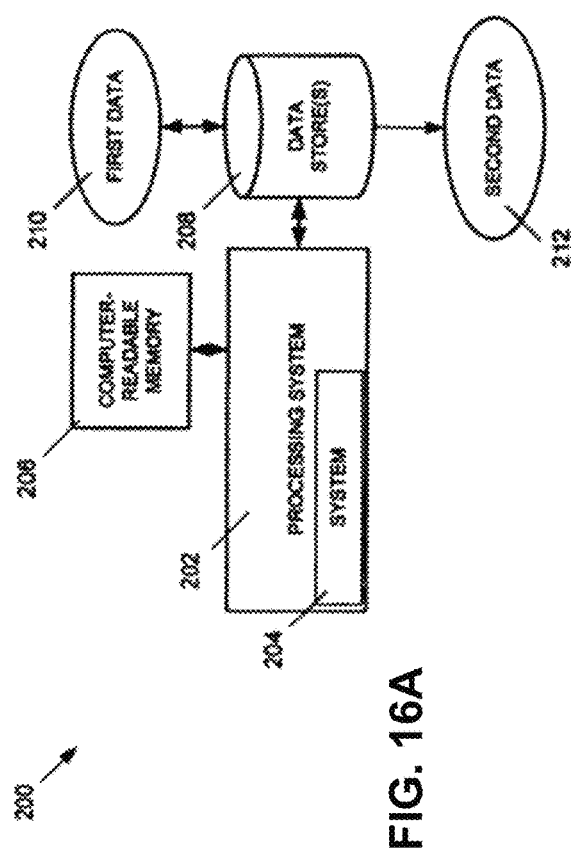
FIGS. 16A-16C depict example systems for use in implementing a system according to one embodiment.
Figure 16B:
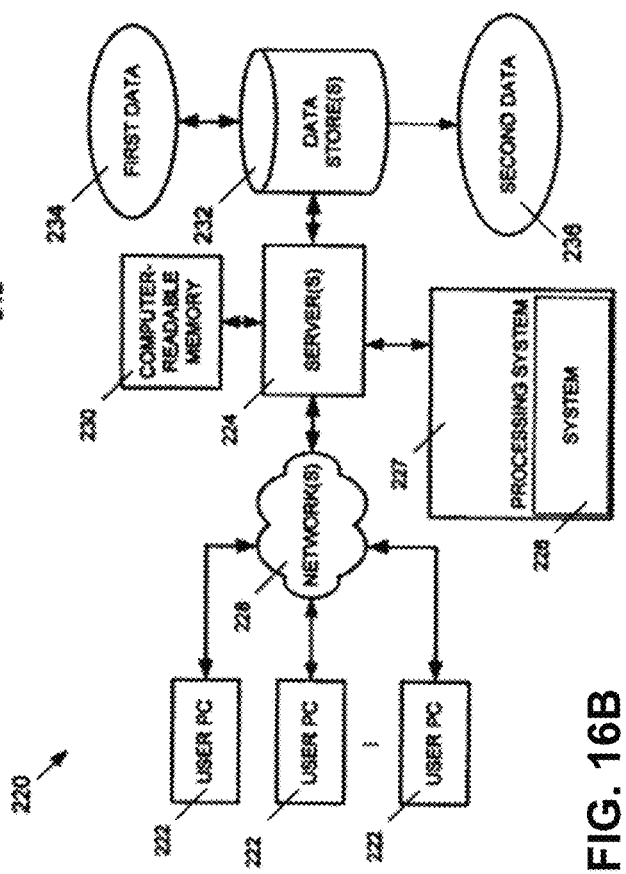
Figure 16C:
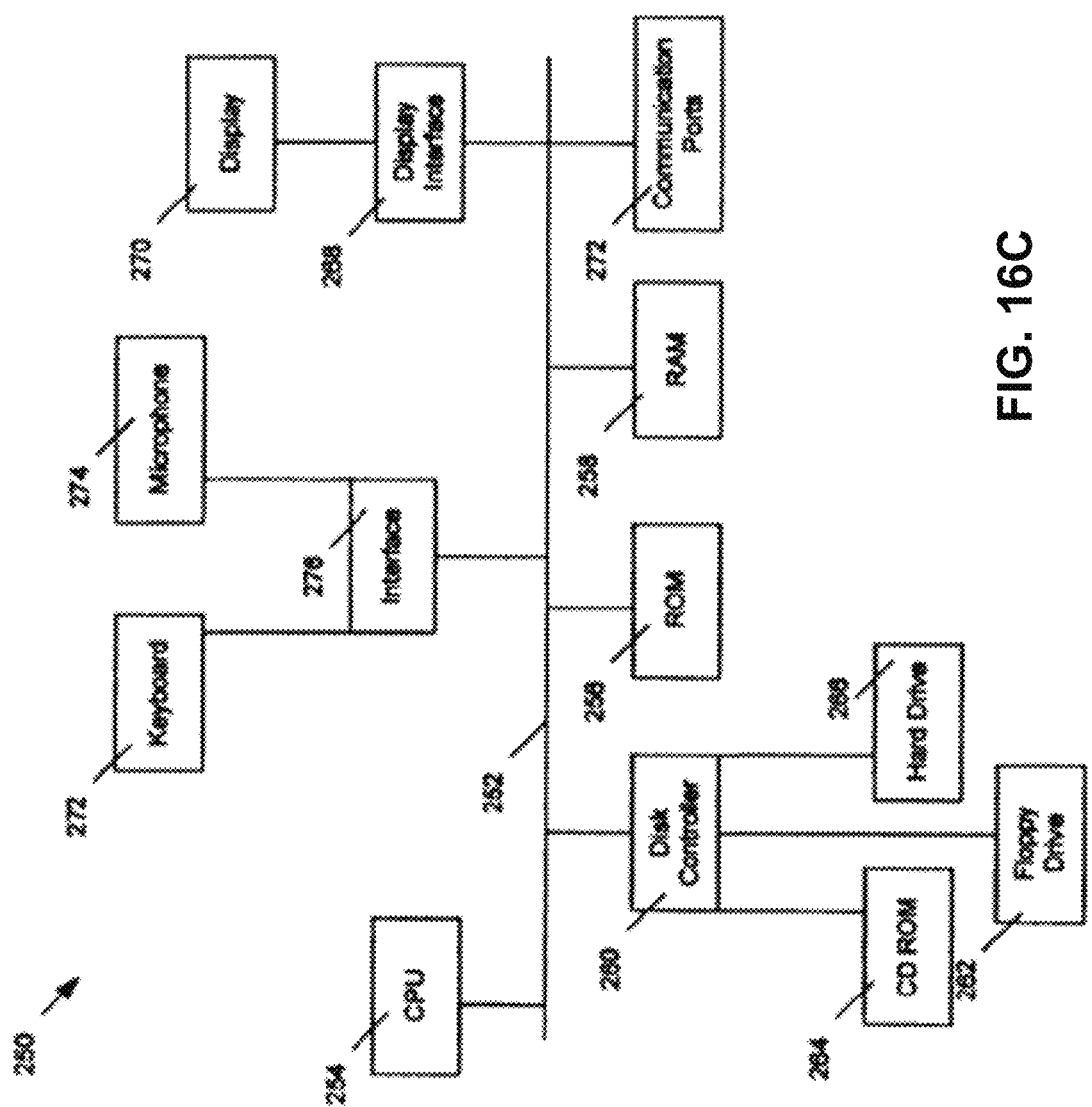

FIGS. 16A-16C depict example systems for use in implementing a system. For example, FIG. 16A depicts an exemplary system 200 that includes a standalone computer architecture where a processing system 202 (e.g., one or more computer processors) includes a system 204 being executed on it. The processing system 202 has access to a non-transitory computer-readable memory 206 in addition to one or more data stores 208. The one or more data stores 208 may contain first data 210 as well as second data 212.

FIG. 16B depicts a system 220 that includes a client server architecture. One or more user PCs 222 accesses one or more servers 224 running a system 226 on a processing system 227 via one or more networks 228. The one or more servers 224 may access a non-transitory computer readable memory 230 as well as one or more data stores 232. The one or more data stores 232 may contain first data 234 as well as second data 236.

FIG. 16C shows a block diagram of exemplary hardware for a standalone computer architecture 250, such as the architecture depicted in FIG. 16A, that may be used to contain and/or implement the program instructions of system embodiments of the present disclosure. A bus 252 may serve as the information highway interconnecting the other illustrated components of the hardware. A processing system 254 labeled CPU (central processing unit) (e.g., one or more computer processors), may perform calculations and logic operations required to execute a program. A non-transitory computer-readable storage medium, such as read only memory (ROM) 256 and random access memory (RAM) 258, may be in communication with the processing system 254 and may contain one or more programming instructions. Optionally, program instructions may be stored on a non-transitory computer-readable storage medium such as a magnetic disk, optical disk, recordable memory device, flash memory, or other physical storage medium. Computer instructions may also be communicated via a communications signal, or a modulated carrier wave, e.g., such that the instructions may then be stored on a non-transitory computer-readable storage medium.

A disk controller 260 interfaces one or more optional disk drives to the system bus 252. These disk drives may be external or internal floppy disk drives such as 262, external or internal CD-ROM, CD-R, CD-RW or DVD drives such as 264, or external or internal hard drives 266. As indicated previously, these various disk drives and disk controllers are optional devices.

Each of the element managers, real-time data buffer, conveyors, file input processor, database index shared access memory loader, reference data buffer and data managers may include a software application stored in one or more of the disk drives connected to the disk controller 260, the ROM 256 and/or the RAM 258. Preferably, the processor 254 may access each component as required.

A display interface 268 may permit information from the bus 256 to be displayed on a display 270 in audio, graphic, or alphanumeric format. Communication with external devices may optionally occur using various communication ports 272.

In addition to the standard computer-type components, the hardware may also include data input devices, such as a keyboard 272, or other input device 274, such as a microphone, remote control, pointer, mouse, touchscreen and/or joystick.

This written description describes exemplary embodiments of the disclosure, but other variations fall within scope of the disclosure. For example, the systems and methods may include and utilize data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

The methods and systems described herein may be implemented on many different types of processing devices by program code comprising program instructions that are executable by the device processing system. The software program instructions may include source code, object code, machine code, or any other stored data that is operable to cause a processing system to perform the methods and operations described herein. Any suitable computer languages may be used such as C, C++, Java, etc., as will be appreciated by those skilled in the art. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

What is claimed is:

1. A computer-implemented method for generating thermophysical characteristics of a material, the method comprising:
    deriving non-equilibrium thermophysical values for phase property changes of a material from equilibrium thermophysical values of the material for a manufacturing process which involves heating and cooling of the material;
    performing a simulation of the manufacturing process based upon the derived non-equilibrium thermophysical values and the equilibrium thermophysical values; and
    generating a set of results based on the simulation, the set of results indicating predicted physical properties of the material for the manufacturing process.

2. The method of claim 1, wherein the set of outputs based on the simulation is used in a finite element solver to simulate the process.

3. The method of claim 2, wherein the process includes a manufacturing process.

4. The method of claim 2, further comprising smoothing the non-equilibrium thermophysical property values over a temperature range when the non-equilibrium thermophysical property values encounter a sudden change as function of temperature.

5. The method of claim 4, wherein the smoothing further comprises:
    calculating an average gradient for each of the non-equilibrium thermophysical property values for the material; and
    back-calculating the non-equilibrium thermophysical property values based on boundary values at solidus and liquidus for the material to smooth out non-smooth thermophysical property value variations.

6. The method of claim 2, wherein the non-equilibrium thermophysical material property values are tabulated into a thermophysical process-specific property look up table for the finite element solver to access the look up table for process simulation.

7. The method of claim 1, wherein the deriving is based on a calculation of phase diagrams approach.

8. A non-transitory computer-readable medium having instructions stored therein, which when executed by a processor, cause the processor to perform operations, the operations comprising:
    deriving non-equilibrium thermophysical values for phase property changes of a material from equilibrium thermophysical values of the material for a manufacturing process which involves heating and cooling of the material;
    performing a simulation of the manufacturing process based upon the derived non-equilibrium thermophysical values and the equilibrium thermophysical values; and
    generating a set of results based on the simulation, the set of results indicating predicted physical properties of the material for the manufacturing process.

9. The non-transitory computer-readable medium of claim 8, wherein the set of outputs based on the simulation is used in a finite element solver to simulate the process.

10. The non-transitory computer-readable medium of claim 9, wherein the process includes a manufacturing process.

11. The non-transitory computer-readable medium of claim 9, wherein the operations further comprise smoothing the non-equilibrium thermophysical property values over a temperature range when the non-equilibrium thermophysical property values encounter a sudden change as function of temperature.

12. The non-transitory computer-readable medium of claim 11, wherein the smoothing further comprises:
    calculating an average gradient for each of the non-equilibrium thermophysical property values for the material; and
    back-calculating the non-equilibrium thermophysical property values based on boundary values at solidus and liquidus for the material to smooth out non-smooth thermophysical property value variations.

13. The non-transitory computer-readable medium of claim 9, wherein the non-equilibrium thermophysical material property values are tabulated into a thermophysical process-specific property look up table for the finite element solver to access the look up table for process simulation.

14. The non-transitory computer-readable medium of claim 8, wherein the deriving is based on a calculation of phase diagrams approach.

15. A data processing system, comprising:
    a processor; and
    a memory coupled to the processor to store instructions, which when executed by the processor, cause the processor to perform operations, the operations including:
        deriving non-equilibrium thermophysical values for phase property changes of a material from equilibrium thermophysical values of the material for a manufacturing process which involves heating and cooling of the material;
        performing a simulation of the manufacturing process based upon the derived non-equilibrium thermophysical values and the equilibrium thermophysical values; and
        generating a set of results based on the simulation, the set of results indicating predicted physical properties of the material for the manufacturing process.

16. The system of claim 15, wherein the set of outputs based on the simulation is used in a finite element solver to simulate the process.

17. The system of claim 16, wherein the process includes a manufacturing process.

18. The system of claim 16, wherein the operations further comprise smoothing the non-equilibrium thermophysical property values over a temperature range when the non-equilibrium thermophysical property values encounter a sudden change as function of temperature.

19. The system of claim 18, wherein the smoothing further comprises:
- calculating an average gradient for each of the non-equilibrium thermophysical property values for the material; and
- back-calculating the non-equilibrium thermophysical property values based on boundary values at solidus and liquidus for the material to smooth out non-smooth thermophysical property value variations.

20. The system of claim 16, wherein the non-equilibrium thermophysical material property values are tabulated into a thermophysical process-specific property look up table for the finite element solver to access the look up table for process simulation.

21. The system of claim 15, wherein the deriving is based on a calculation of phase diagrams approach.

22. A computer-implemented method for generating thermophysical characteristics of a material, the method comprising:
- deriving equilibrium thermophysical values for phase property changes of a material based on a material composition of the material for a manufacturing process which involves heating and cooling of the material;
- performing a simulation of the manufacturing process based upon the derived equilibrium thermophysical values; and
- generating a set of results based on the simulation, the set of results indicating predicted physical properties of the material for the manufacturing process.

* * * * *